(12) United States Patent
Wang et al.

(10) Patent No.: US 10,649,459 B2
(45) Date of Patent: May 12, 2020

(54) DATA SEGMENTATION USING MASKS

(71) Applicant: Zoox, Inc., Menlo Park, CA (US)

(72) Inventors: Zeng Wang, Menlo Park, CA (US);
David Pfeiffer, Menlo Park, CA (US);
Dragomir Dimitrov Anguelov, San Francisco, CA (US); Subhasis Das, Menlo Park, CA (US); Allan Zelener, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 192 days.

(21) Appl. No.: 15/963,833

(22) Filed: Apr. 26, 2018

(65) Prior Publication Data
US 2019/0332118 A1 Oct. 31, 2019

(51) Int. Cl.
| | |
|---|---|
| *G06T 7/181* | (2017.01) |
| *G06T 7/187* | (2017.01) |
| *G05D 1/02* | (2020.01) |
| *G01S 17/89* | (2020.01) |
| *G05D 1/00* | (2006.01) |
| *G06N 3/08* | (2006.01) |
| *G06K 9/62* | (2006.01) |
| *G06K 9/00* | (2006.01) |
| *G06T 7/521* | (2017.01) |

(52) U.S. Cl.
CPC ............ *G05D 1/0238* (2013.01); *G01S 17/89* (2013.01); *G05D 1/0088* (2013.01); *G05D 1/0221* (2013.01); *G06K 9/00201* (2013.01); *G06K 9/00805* (2013.01); *G06K 9/6268* (2013.01); *G06N 3/08* (2013.01); *G06T 7/181* (2017.01); *G06T 7/187* (2017.01); *G06T 7/521* (2017.01); *G05D 2201/0213* (2013.01); *G06T 2207/10028* (2013.01); *G06T 2207/20084* (2013.01); *G06T 2207/30252* (2013.01)

(58) Field of Classification Search
CPC ........... G06T 7/187; G06T 2207/10028; G06T 2207/20084
See application file for complete search history.

(56) References Cited

U.S. PATENT DOCUMENTS

| | | | |
|---|---|---|---|
| 2013/0325241 A1 | 12/2013 | Lombrozo et al. | |
| 2015/0268058 A1 | 9/2015 | Samarasekera et al. | |
| 2018/0307911 A1* | 10/2018 | Zohourian | G06K 9/00718 |
| 2019/0287254 A1* | 9/2019 | Lakshmi Narayanan | G06T 5/50 |

FOREIGN PATENT DOCUMENTS

| | | |
|---|---|---|
| DE | 102016200656 | 7/2017 |
| WO | WO2018052322 A1 | 3/2018 |

OTHER PUBLICATIONS

The PCT Search Report and Written Opinion dated Jul. 25, 2019 for PCT Application No. PCT/US2019/028667, 7 pages.

* cited by examiner

*Primary Examiner* — Todd M Melton
(74) *Attorney, Agent, or Firm* — Lee & Hayes, P.C.

(57) ABSTRACT

A vehicle can include various sensors to detect objects in an environment. Sensor data can be captured by a perception system in a vehicle and represented in a voxel space. Operations may include analyzing the data from a top-down perspective. From this perspective, techniques can associate and generate masks that represent objects in the voxel space. Through manipulation of the regions of the masks, the sensor data and/or voxels associated with the masks can be clustered or otherwise grouped to segment data associated with the objects.

20 Claims, 9 Drawing Sheets

DATA SEGMENTATION USING MASKS

BACKGROUND

Autonomous vehicles can use sensors to capture data of an environment. To navigate an environment effectively, autonomous vehicles use sensor data to detect objects in the environment to avoid collisions. Segmentation techniques can be used for associating sensor data with objects. Segmentation of three-dimensional data, however, presents particular challenges that can result in inaccurate object detection, segmentation, and/or poor responsiveness of object detection and segmentation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
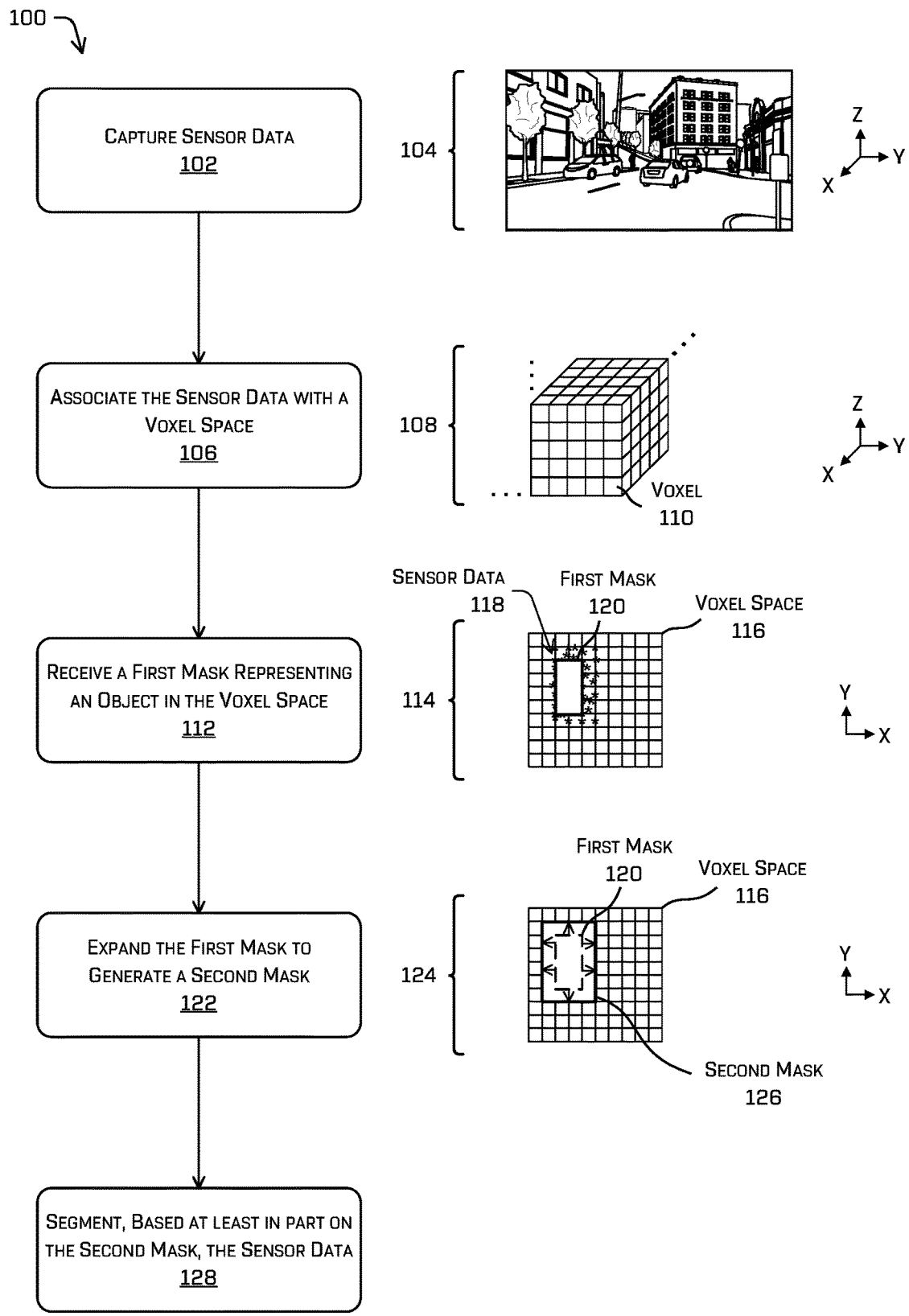
FIG. 1 illustrates a pictorial flow diagram of an example process for top-down segmentation.

This disclosure describes methods, apparatuses, and systems for performing segmentation on three-dimensional data represented in a volume element ("voxel") space to determine objects in an environment. For example, an autonomous vehicle can include a plurality of sensors to capture sensor data corresponding to an environment of the vehicle. The sensor data can include data associated with an environment where, in some instances, multiple objects (e.g., pedestrians, vehicles, bicyclists, etc.) are located adjacent or in close proximity to one another. The techniques described herein can include, but are not limited to, capturing the sensor data, associating the sensor data with a voxel space, viewing the sensor data from a "top-down perspective," and using a machine-learning algorithm to output masks associated with the one or more objects. Such algorithms may be trained to output masks representing an region smaller than the detected one or more objects so that, in an inference mode, a size of the masks can be increased until a threshold is reached, where the threshold can be represented by a fixed value margin or a percentage of the mask, or until the mask intersects another mask representing another vehicle and/or object. The voxels within the masks can be associated with one or more object identifiers and the data associated with the masks can be segmented. The segmented data can be passed to other classifiers to classify the one or more objects and/or to a planning system to determine a trajectory of the vehicle. The segmentation techniques can be used on LIDAR data, RADAR data, image data, etc.

As discussed herein, sensor data can be captured by one or more sensors and can be represented in a voxel space. The voxel space can include representing the sensor data in a grid of voxels in a three-dimensional space. With the sensor data represented in the voxel space, processing can include using a machine learning algorithm to output a mask associated with an object in the environment. In some instances, the mask can be represented in a plan view or top-down perspective. In other instances, the mask can be represented in an elevation view or a side perspective. As mentioned above, such a machine-learning algorithm may be trained to output a mask having dimensions slightly smaller than associated ground truth objects.

By expanding a first mask output during inference, the system can generate a second mask (e.g., also referred to as an "expanded mask") associated with the object in the environment. In some instances, a size of the mask can be increased up to a threshold increase, and accordingly, the second mask can represent a portion of the sensor data with an overall higher confidence level of representing an object than without the second mask. Additionally, in some instances, the second mask can represent a portion of the sensor data with an overall higher confidence level of representing an object than a mask without the techniques described herein.

The system can segment the sensor data based at least in part on the second mask. Based on the segmentation data, the system can detect and determine a number of objects associated with the sensor data and the environment. In some instances, the system can use the segmentation data to generate a trajectory for a vehicle and control the vehicle to traverse an environment.

As can be understood, determining and detecting objects in an environment can require a significant amount of cost in terms of the amount of data processing required and computing resources. Additionally, transmitting significant amounts of data increases power consumption and may also increase network congestion. Traditional methods may also consume a significant amount of time to determine and detect objects in an environment. Meanwhile, methods of determining and detecting objects in an environment must provide accurate results, particularly in the context of vehicles and autonomous vehicles. For example, previous segmentation techniques have used clustering techniques or region growing techniques which can result in combining discrete objects as a single object (e.g., undersegmentation), as well as techniques which divide a single object into multiple discrete objects (e.g., oversegmentation). Thus, the techniques discussed herein improve the accuracy of segmentation on various types of data.

The top-down segmentation techniques discussed herein can improve a functioning of a computing device by reducing the amount of computing resources to segment sensor data. In some instances, reducing the amount of computing resources takes the form of reducing the amount of data operated on. In other instances, reducing the amount of computing resources takes the form of more efficiently processing the data. In other instances, reducing the amount of computing resources takes the form of both reducing the amount of data used as wells as more efficiently processing the data. Additionally, in some instances, reducing the amount of computing resources includes reducing processing time, reducing memory usage, reducing network congestion, and/or reducing power consumption. The techniques described herein can also maintain and/or increase the accuracy of determining and detecting objects in an environment. As can be understood, maintaining and/or increasing the accuracy of determining and detecting objects can improve safety outcomes, particularly in the context of vehicles and autonomous vehicles. The techniques described herein can also improve safety outcomes by reducing the processing time of determining and detecting objects. As can be understood, in the context of vehicles and autonomous vehicles, situations may arise where determination and detection of objects must occur quickly and accurately. As a non-limiting example, other methods which undersegment and/or oversegment objects in an environment may cause errors in subsequent systems (e.g., classification systems, planning systems, etc.) which rely on such data for safe vehicle operation. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In another example, the methods, apparatuses, and systems may be used in an aviation or nautical context. Additionally, the techniques described herein may be used with real data (e.g., captured using sensor(s)), simulated data (e.g., generated by a simulator), or any combination of the two.

FIG. 1 illustrates a pictorial flow diagram of an example process 100 for capturing sensor data, associating the sensor data with a volume element ("voxel") space, receiving a mask representing an object in the voxel space, expanding the mask to generate an expanded mask or a second mask, and segmenting, based at least in part on the second mask, the sensor data.

At operation 102, the process 100 can include capturing LIDAR (light detection and ranging) data as the sensor data. The operation 102 can also include capturing a variety of sensor data which can include RADAR data, SONAR data, image data, audio data, infrared data, location data, or any combination thereof. In some instances, the operation 102 can include capturing sensor data from a plurality of sensors. In some instances, operation 102 can include extracting a portion of the sensor data for processing, such as over a period of time. An example of sensor data is illustrated in an example 104, which may include LIDAR data (e.g., data points or a point cloud) associated with various objects in an environment, such as vehicles, roads, trees, pedestrians, buildings, etc.

At operation 106, the process 100 can include associating the sensor data with a voxel space. An example 108 illustrates a voxel space including five voxels in each dimension (e.g., x, y, and z), although any number of voxels may be included in the voxel space. In some instances, the voxel space may correspond to a physical environment, such as an area around an origin or a virtual origin of the sensor data. For example, the voxel space may represent an area 100 meters wide, 100 meters long, and 20 meters high. Further, each voxel (e.g., a voxel 110) in the voxel space may represent a physical area, such as 25 centimeters in each dimension. As can be understood in the context of this disclosure, the voxel space may represent any region of an environment (e.g., a region proximate to the vehicle which is updated as the vehicle moves), and individual voxels may represent any volume as well. In some instances, voxels may be a uniform size throughout the voxel space, while in some instances, a volume of a voxel may vary based on a location of the voxel relative to an origin of the data. For example, as the density of sensor data may decrease as a distance from a sensor increases, the size of a voxel in a voxel space may increase in proportion to a distance from the voxel to a sensor (or an origin representing a plurality of sensors).

In one example, the voxel space may be initialized as empty space and sensor data may be added to the voxel space as it is captured. In another example, the voxel space may be initialized with data representing a global map of previously captured data. In the case of using global map data, the operations may include comparing the locally captured sensor data with the global data to localize the vehicle in the global map space.

In some instances, the operation 106 can include mapping individual data points of the sensor data to individual voxels. In some instances, the operation 106 can include subtracting a motion vector associated with the sensor data, for example, in an event that the sensor data is captured by a moving platform, such as an autonomous vehicle, to convert the sensor data to, for example, a stationary reference point. That is, in some instances (e.g., when using RADAR data), the sensor data may be associated with a voxel space that is fixed with respect to a global map, for example (e.g., in contrast to a voxel space fixed with respect to a moving vehicle). In some instances, the operation 106 can include discarding or omitting voxels that do not include data, or that include a number of data points below a threshold number, in order to create a sparse voxel space. Further, in some instances, the operation 106 can include aligning a pose of the vehicle (e.g., an orientation of the vehicle) and associated sensor data with the voxel space, for example, to compensate or adjust for possible errors associated with a position of the vehicle with respect to the voxel space.

Further, in some instances, the operation 106 can include statistically accumulating sensor data and processing the sensor data as it is added to individual voxels. For example, individual voxels may include sensor data representing a number of data points, an average intensity, an average x-value of the sensor data, an average y-value of the sensor data, an average z-value of the sensor data, and/or a covariance matrix based on the sensor data associated with the individual voxel. Thus, in some instances, data associated with individual voxels may represent processed data, in part, to improve processing performance of the system.

At operation 112, the process 100 can include receiving a first mask representing an object in the voxel space. In some instances, a machine learning algorithm can be trained to output at least one mask associated with a voxel space. Additionally, in some instances, the machine learning algorithm can use sensor data to output the mask. In other instances, the machine learning algorithm can use sensor data and/or processed sensor data to output the mask. In the context of this application, "top-down" refers to the corresponding voxel data as input into such a machine learning algorithm. Particularly, the algorithm accepts voxel data in the form of an image of size equal to the number X and Y discretizations of the grid, the image having a number of channels equal to the number of discretizations in the Z dimension, where the Z dimension is indicative of a height dimension, as well as any other number of channels (such as additional features) as described herein. That is, the voxel data is effectively rotated such that it is viewed from above and subsequently input into a machine learning algorithm. In some examples, the algorithm can accept the voxel data that is effectively rotated such that it is viewed from an elevation view or a side view.

The mask, in some instances, can represent a region in a voxel space associated with an object. As will be described in detail below, such a machine learning algorithm is trained to output a mask smaller in dimension than the associated object. The process 100, in other instances, can include generating a mask associated with an object in the voxel space. In both instances, either receiving the mask or generating the mask, the mask can be based at least in part on the sensor data captured in the operation 102.

An example 114 illustrates a top-down view or a plan view of voxel space 116. The example 114 also illustrates sensor data 118. For purposes of illustration, the sensor data 118 can be the sensor data captured at the operation 102 associated with an environment. The example 114 also illustrates a first mask 120 associated with the voxel space 116. The first mask 120 can represent an object in the voxel space and can be associated with an object as shown in example 104. For purposes of illustration and as a non-limiting example, the first mask 120 is associated with a smaller number of voxels in the voxel space 116 than the sensor data 118.

In some instances, individual voxels of the voxels space 116 can comprise a plurality of features. As a non-limiting example, individual voxels can comprise features such as mean or average three-dimensional coordinate values, a covariance matrix of the coordinate values, semantic segmentation probabilities (that is, a set of probabilities indicating whether the voxel belongs to different classes of objects), an indication of occupancy (i.e., whether there is any data in the voxel or not), ray casting information (e.g., indicating whether a ray from a LIDAR has passed through a voxel), and/or background subtraction information (e.g., indicating whether an object represented in sensor data is a background object (e.g., a static object) or whether an object is a transitory object (e.g., parked car, pedestrian, animal, car, etc.)). In some instances, the voxel space 116 can represent a "collapsed" version of the full voxel space as shown in the example 108. In other instances, the voxel space 116 can be represented or envisioned as a plurality of pseudo-pixels where each pseudo-pixel is associated with a column of voxels. Additionally, in some instances, individual pseudo-pixels can comprise or can be associated with all of the features of the voxels associated with the individual pseudo-pixel. As a non-limiting example, a voxel grid of dimensions 400×400×7 may be represented as a 400×400 image with 119 channels. That is, the 119 channels can represent 7 channels for each of the voxel grid height times 17 features per height voxel (three channels of average position, nine channels for the covariance matrix, an occupancy channel, and four channels of semantic classification probabilities).

At operation 122, the process 100 can include expanding the first mask to generate a second mask. In some instances, the system can expand the first mask by a margin, either a fixed value or a percentage, or both. In other instances, the system can expand the first mask by a fixed value or a percentage, or both, incrementally. In some instances, the system can expand the first mask based at least in part on a region growing operation associated with an occupancy of voxels or pseudo-pixels. In some instances, the second mask can represent the same area as the first mask. Additionally, in some instances, an expansion of the first mask may not be uniform in all directions. Thus, for purposes of illustration, when generating the second mask, the system can expand one side of the first mask by a greater or lesser amount than a different side of the first mask.

In other instances, the second mask, as a result of the operations discussed herein, can represent a smaller area or a larger area relative to the first mask. Additionally, the system can generate the second mask using at least a portion of the sensor data. In other instances, the system can generate the second mask using margin data associated with the first mask from the machine learning algorithm. In other instances, the system can generate the second mask while referencing an additional mask representing an additional object in the voxel space. Thus, for purposes of illustration, the system can expand the first mask until it reaches threshold increase and/or until it reaches an additional mask.

An example 124 illustrates a top-down view of voxel space 116. The example 124 also illustrates the first mask 120 as discussed in the example 114. The example 124 additionally illustrates an expanded mask or a second mask 126 as discussed above. Thus, for purposes of illustration, the second mask 126 can represent the first mask 120 after expanding the first mask 120 by a margin or by using clustering techniques based at least in part on region growing algorithms.

At operation 128, the process 100 can include segmenting, based at least in part on the second mask, the sensor data. In some instances, the second mask can be associated with an object in the voxel space. Additionally, in some instances, the second mask can be associated with a portion of the sensor data. Thus, for purposes of illustration, the system can segment the sensor data by segmenting the sensor data associated with the second mask directly. Additionally, the system can segment the sensor data associated with the voxels, where the voxels can be associated with the second mask.

For purposes of illustration, the system can apply one or more clustering techniques, such as region growing, to the sensor data or the voxels associated with the second mask to associate all nearby data with a single object. Additionally, the system can associate an object identifier with the sensor data or the voxels associated with the second mask. As above, such region growing may propagate until there are no additional occupied voxels within a given radius, for a preset number of voxels, or until the region collides with one or more additional regions grown substantially simultaneously.

The segmentation techniques described herein can improve a functioning of a computing device by providing a framework for efficiently segmenting data for object detection. For example, by using a top-down perspective, the amount of data can be reduced, which as described above, can reduce the amount of computing resources consumed. Additionally, reducing the amount of data can allow a computing device to process the data more efficiently. In some instances, the system can transmit some of the data to a different computing device and, therefore, reduce network congestion by transmitting less data. In some instances, the system can also reduce the amount of processing time to segment data for object detection. In some instances, a boundary of the segmentation can be defined at least in part on the second mask. That is, in some cases, without the second mask, a clustering technique may cluster voxels from multiple discrete objects into a single object. Thus, the use of the techniques discussed herein can improve an accuracy of segmentation by preventing merging of regions associated with discrete objects.

In some instances, data associated with the detected objects can be provided to a planner system to generate a trajectory for an autonomous vehicle that traverses an environment using the trajectory. In some instances, data associated with the detected objects can be provided to other segmentation algorithms and/or classification algorithms for further processing. These and other operations are possible as part of the techniques described herein.

Figure 2:
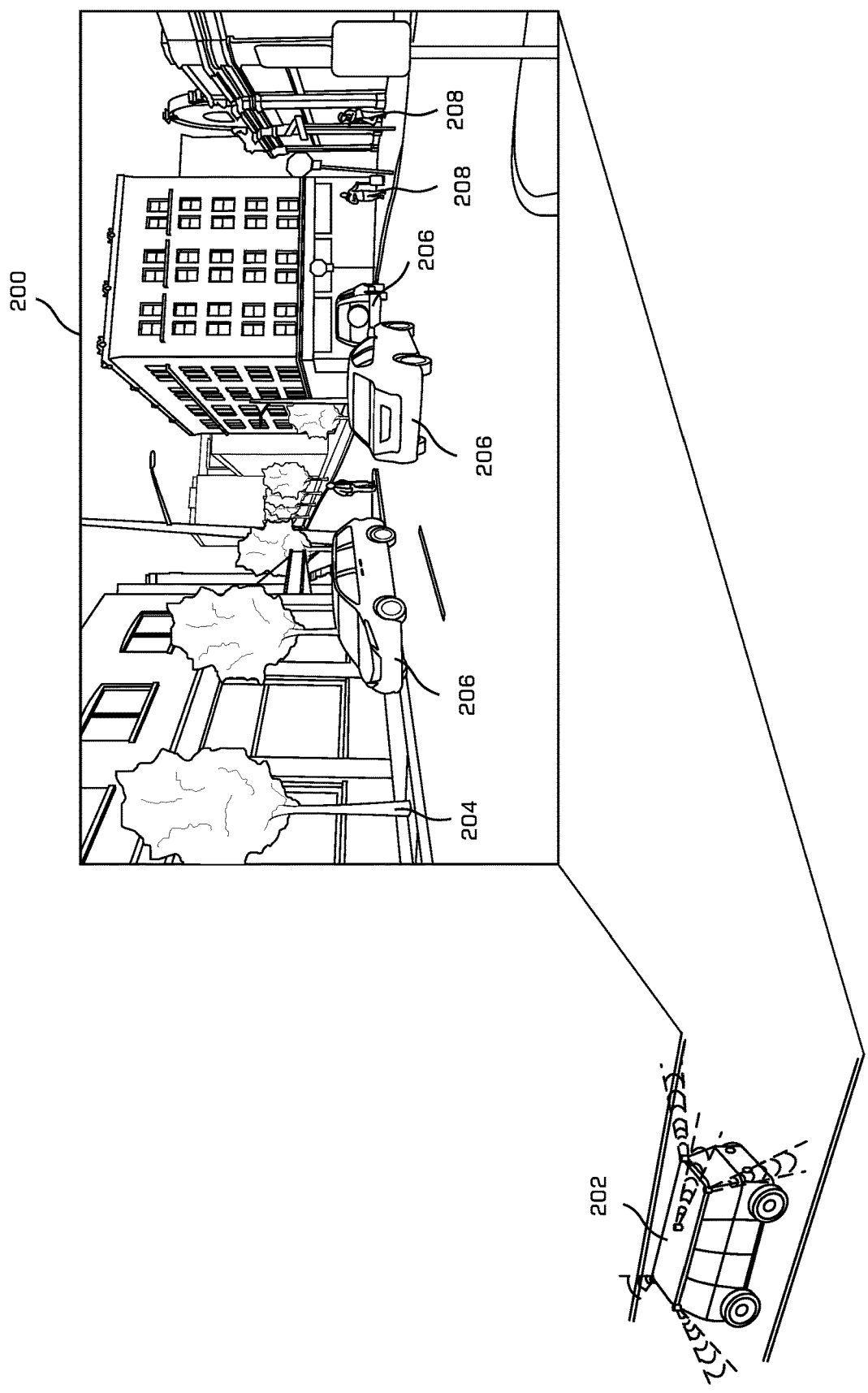
FIG. 2 depicts an example vehicle capturing sensor data of an environment.

FIG. 2 illustrates an example environment 200 through which an example vehicle 202 is traveling. The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using machine vision, and is not limited to vehicles.

The example vehicle 202 may be any configuration of vehicle, such as, for example, a van, a sport utility vehicle, a cross-over vehicle, a truck, a bus, an agricultural vehicle, and a construction vehicle. The vehicle 202 may be powered by one or more internal combustion engines, one or more electric motors, hydrogen power, any combination thereof, and/or any other suitable power sources. Although the example vehicle has four wheels, the systems and methods described herein may be incorporated into vehicles having fewer or a greater number of wheels, tires, and/or tracks. The example vehicle 202 may have four-wheel steering and may operate generally with equal performance characteristics in all directions, for example, such that a first end of the vehicle 202 is the front end of the vehicle 202 when traveling in a first direction, and such that the first end becomes the rear end of the vehicle 202 when traveling in the opposite direction. Similarly, a second end of the vehicle 202 is the front end of the vehicle when traveling in the second direction, and such that the second end becomes the rear end of the vehicle 202 when traveling in the opposite direction. These example characteristics may facilitate greater maneuverability, for example, in small spaces or crowded environments, such as parking lots and/or urban areas.

A vehicle such as the example vehicle 202 may be used to travel through the environment 200 and collect data. For example, the vehicle 202 can include one or more sensors where, for purposes of illustration, the one or more sensors can be one or more LIDAR sensors. Other sensor types are contemplated (e.g., RADAR sensors, SONAR sensors, image sensors, audio sensors, infrared sensors, location sensors, etc., or any combination thereof).

As the vehicle 202 travels through the environment 200, the sensors can capture sensor data associated with the environment. Additionally, some of the sensor data can be associated with objects (e.g., trees 204, vehicles 206, and pedestrians 208). The sensor data can be associated with other objects including, but not limited to, buildings, road surfaces, signage, barriers, etc.

Figure 3A:
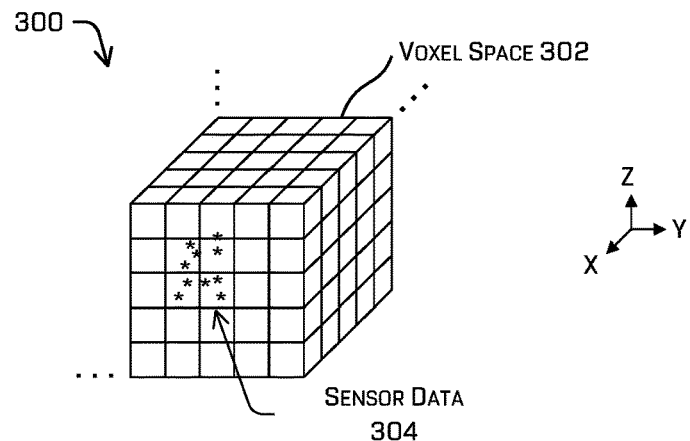
FIG. 3A depicts an example voxel space with sensor data associated with the voxel space.

FIG. 3A illustrates an example 300 including a three-dimensional voxel space 302 with sensor data 304 associated with the voxel space 302. As the example 300 illustrates, the voxel space 302 can extend in the three dimensions, and the example 300 illustrations a portion of the entire voxel space. The sensor data 304 can include LIDAR data. In some instances, the voxel space 302 can represent any number of features, including but not limited to, a covariance matrix, location information, classification information, segmentation information, a number of observations, whether the voxel is occupied or not, at the like. Though depicted as a multiple data points for illustrative purposes, such sensor data 304 is stored per voxel.

Figure 3B:
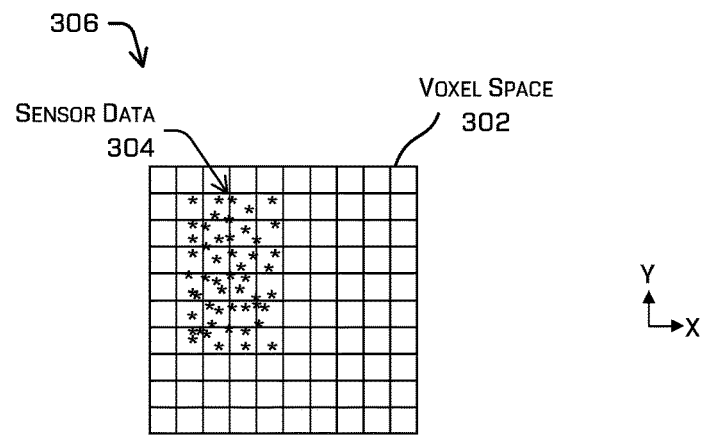
FIG. 3B depicts an example portion of a voxel space viewed from a top-down perspective with sensor data associated with the portion of the voxel space.

FIG. 3B illustrates an example 306 of the voxel space 302 from a top-down perspective or plan view and illustrates the sensor data 304 associated with the voxel space 302.

Figure 3C:
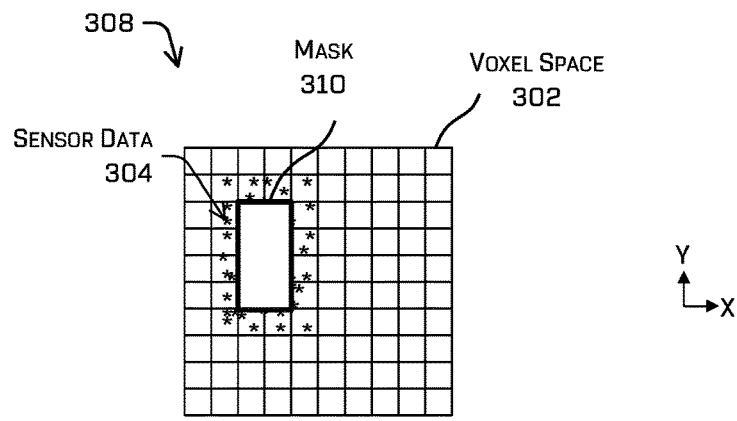
FIG. 3C depicts an example voxel space viewed from a top-down perspective with a mask associated with the portion of the voxel space.

FIG. 3C illustrates an example 308 of the voxel space 302 and the sensor data 304 associated with the voxel space 302. The example 308 also illustrates a mask 310 (which may correspond to the first mask 120 as illustrated in FIG. 1) from a top-down perspective. As discussed above, a machine learning algorithm can output the mask 310. Thus, for purposes of illustration, a machine learning algorithm can use the sensor data 304 to output the mask 310 which can, in some instances, represent an object in the voxel space 302. In other instances, the system can generate the mask 310. As discussed above, in some instances, the machine learning algorithm can output the mask 310 that is associated with a fewer number of voxels than the sensor data 304. In other instances, the machine learning algorithm can output the mask 310 that is associated with an equal number or a greater number of voxels as the sensor data 304.

Figure 4A:
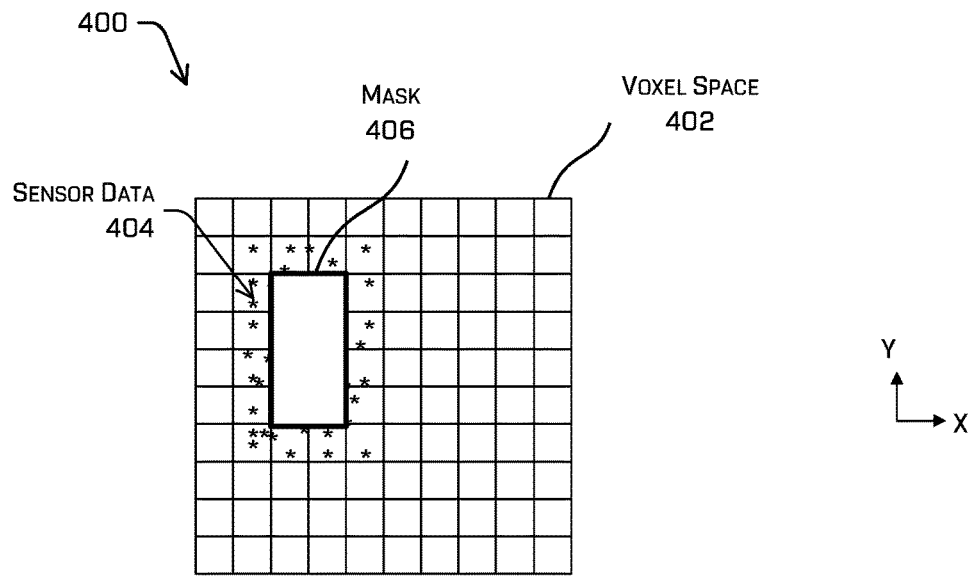
FIG. 4A depicts a pictorial flow diagram of an example process of generating an expanded mask.
Figure 4A:
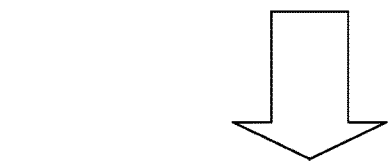
Figure 4A:
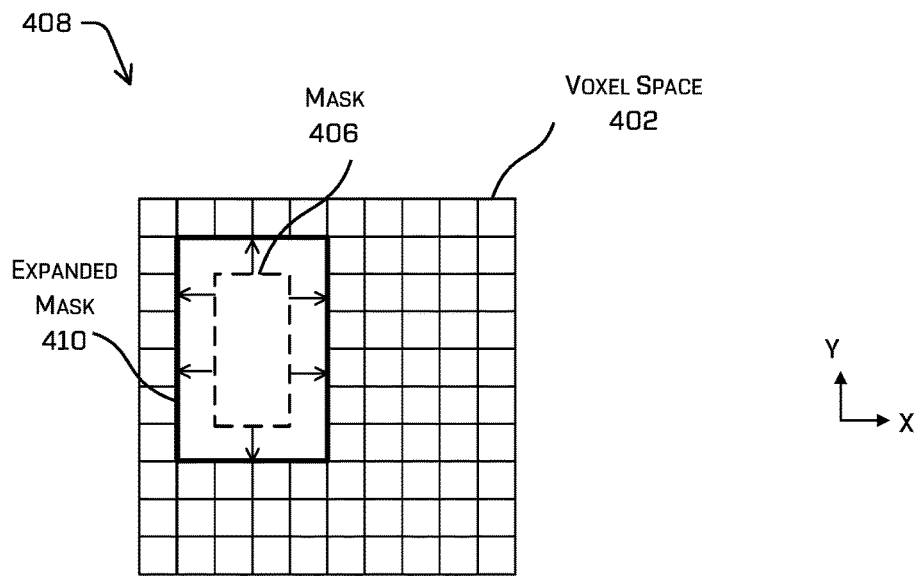

FIG. 4A illustrates an example 400 of a voxel space 402 with sensor data 404. The example 400 also illustrates a mask 406 from a top-down perspective. For purposes of illustration, the voxel space 402 can represent the voxel space 302 and the mask 406 can represent the mask 310. As discussed above, a machine learning algorithm can output the mask 406 that is associated with a fewer number of voxels than the sensor data 404.

Figure 4B:
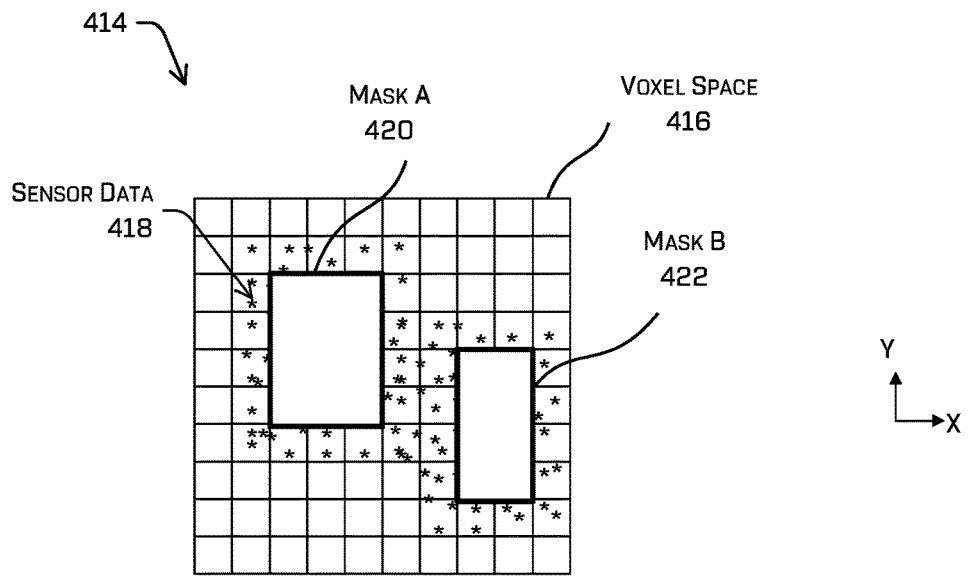
FIG. 4B depicts a pictorial flow diagram of an example process of generating masks associated with different objects represented in the voxel space.
Figure 4B:
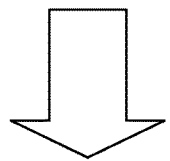
Figure 4B:
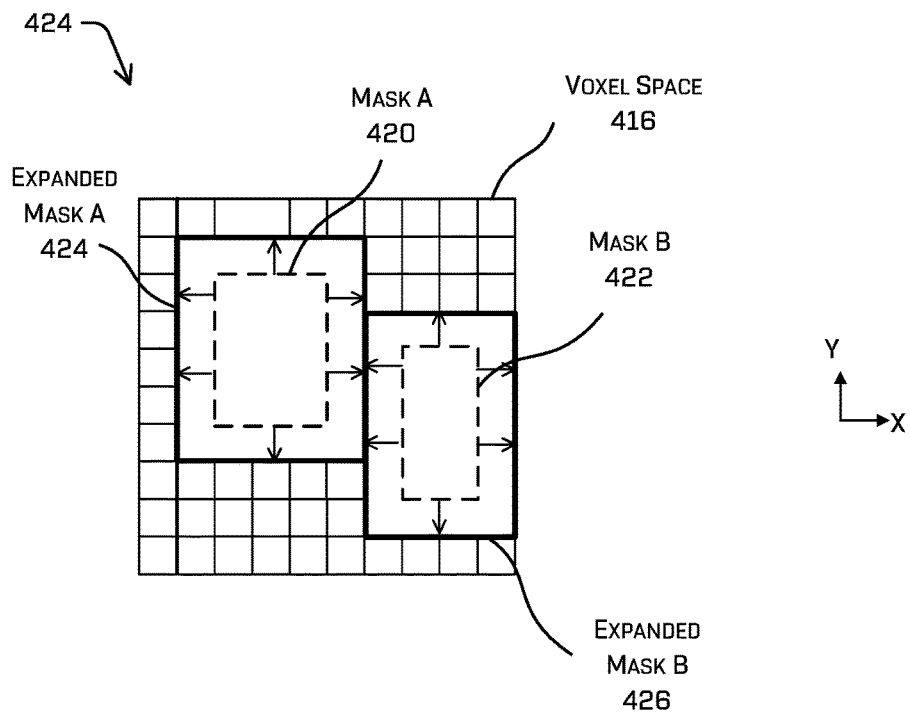

FIG. 4A also illustrates an example 408 of the voxel space 402 and the mask 406. Additionally, the example 408 also illustrates an expanded mask 410. As a non-limiting example, by performing the techniques described herein, the example 400 can result in the example 408. In some instances, the system can use clustering techniques or region growing techniques to combine discrete voxels to generate the expanded mask 410. In other instances, the system can generate the expanded mask 410 by increasing the mask 406 by a margin, where the margin can be a fixed value or percentage. In other instances (and as illustrated in FIG. 4B), the system can generate the expanded mask 410 until the expanded mask 410 intersects a different mask. Further, in other instances, the system can use a combination of the above techniques to generate the expanded mask 410. The example 408 shows an instance where, by performing the techniques described herein, the expanded mask 410 is associated with the voxels in the voxels space 402 that were also associated with the sensor data 404. In other instances, the expanded mask 410 can be associated with fewer than or greater than the number of voxels that were associated with the sensor data 404.

FIG. 4B illustrates an example 414 of a voxel space 416 with sensor data 418. The example 414 also illustrates a mask A 420 and a mask B 422. As can be understood, FIG. 4A represents an environment where one object (e.g., a vehicle) is present, while FIG. 4B represents an environment where two objects (e.g., two vehicles) can be adjacent or in close proximity to one another in the environment. As discussed above, a machine learning algorithm can output mask A 420 and mask B 422 as associated with a fewer number of voxels than the sensor data 418.

FIG. 4B also illustrates an example 424 of the voxel space 416 with the mask A 420 and the mask B 422. As a non-limiting example, by performing the techniques described herein, the example 414 can result in the example 424. The example 424 also shows an expanded mask A 424 and an expanded mask B 426. As the system generates the expanded masks, the system can determine that either the expanded mask A 424 or the expanded mask B 426, or both, can meet or intersect with another mask. In some instances, the system can expand the first masks by a margin that is a fixed value or a percentage. Then, the system can reduce the expanded masks incrementally until they do not satisfy an intersection criterion. In other instances, the system can expand the masks incrementally while checking for either meeting or intersecting with another mask. In the example 424, the system expanded the mask A 420 and the mask B 422 by margins such that the resulting expanded mask A 424 and expanded mask B 426 do not intersect. In some instances, the system can be configured to allow the expanded masks to meet and/or intersect by an overlap threshold. In other instances, the system can be configured to expand the masks but not allow the expanded masks to meet. For example, upon determining that masks intersect or touch, the system can reduce a size of one or both mask to introduce a buffer between the two masks.

After generating the expanded mask(s) or the second mask(s), the system can, as discussed above, use clustering techniques such as region growing on the sensor data or the voxels associated with the second mask(s) to determine an object in the voxel space. That is, clustering operations can be effectively bounded by a mask. Additionally, the system can associate an object identifier with the sensor data or the voxels associated with the second mask(s).

Figure 5:
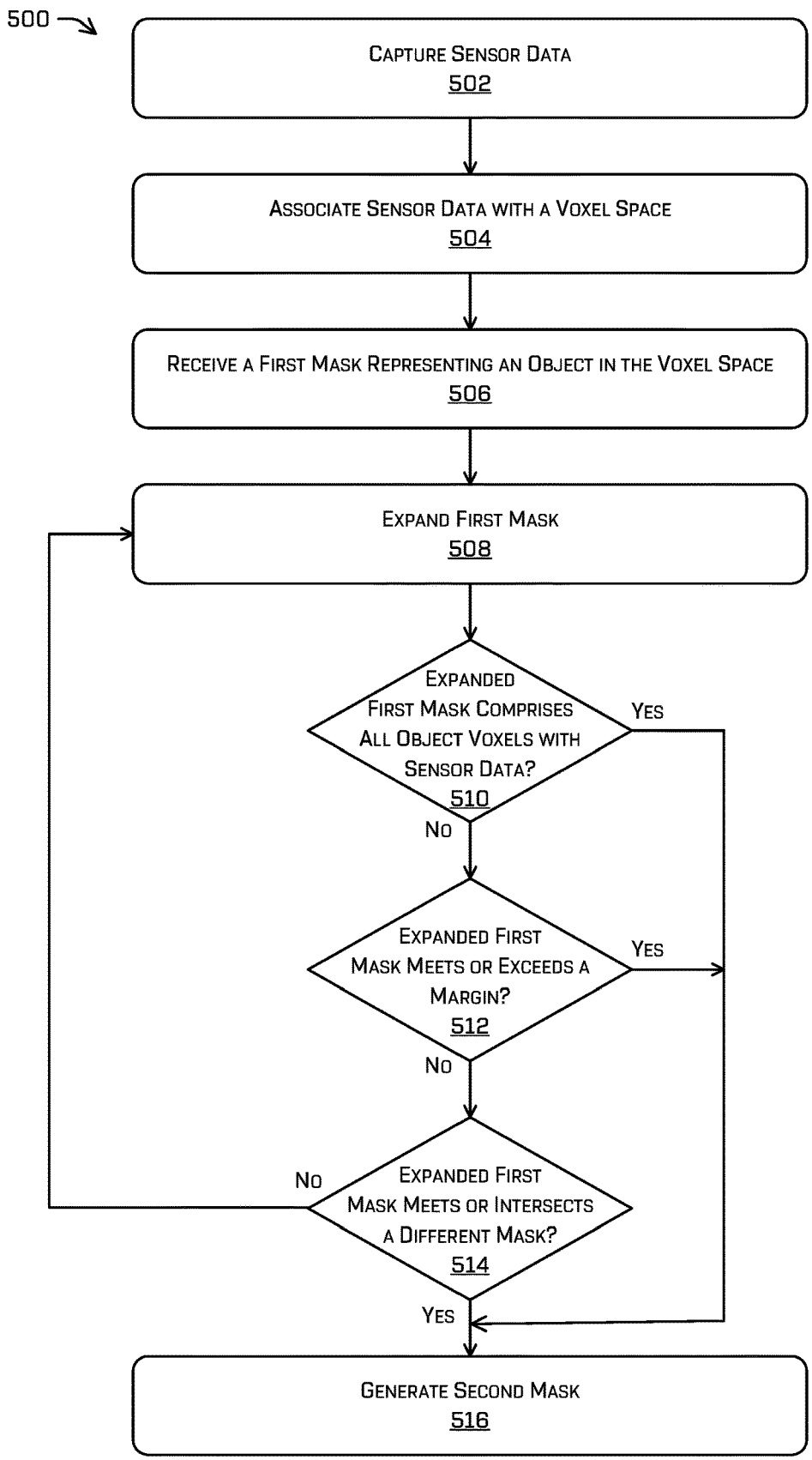
FIG. 5 depicts an example process for expanding a first mask to generate a second mask.

FIG. 5 depicts an example process 500 for generating an expanded mask (e.g., a second mask). In some examples, some or all of the process 500 can be performed by one or more components in FIG. 6, as described herein.

At operation 502, the process 500 can include capturing sensor data of an environment. As discussed above, the sensor data can represent LIDAR data, RADAR data, image data, and the like. At operation 504, the process 500 can include associating the sensor data with a voxel space. As discussed above, in some instances, sensor data may be represented in the voxel space as raw sensor data (e.g., with individual <x, y, z, range, time, etc.>values associated with data points) and/or may be represented as a statistical accumulation of data.

At operation 506, the process 500 can include receiving a first mask representing an object in the voxel space. For example, the first mask may represent an object such as a vehicle in an environment. In some instances, the first mask may represent the object from a second perspective that is different than the first perspective associated with capturing the sensor data. For example, the first mask may represent a top-down view of the object represented in the voxel space. In some instances, the first mask can be received from a machine learning algorithm trained to output a mask associated with voxel data. In some instances, a mask output by the machine learning algorithm can be based at least in part on classification data or segmentation data associated with the voxel data. In one example, a mask associated with voxels associated with a "pedestrian" classification can be generated at as a fixed size, while in another example, a mask associated with voxels associated with a "vehicle" classification can be generated based on a size of the voxel data. Masks can be generated based on a variety of factors, and is not limited to the examples discussed herein. In some examples, the machine learning algorithm is trained to output the mask centered at a cluster of data (an average, a centroid, a highest density of data, or the like).

At operation 508, the process 500 can expand the first mask. As discussed above, the process 500 can expand the first mask by a fixed value or a percentage, or the process 500 can expand the first mask incrementally. In some instances, the process 500 can expand the first mask using clustering techniques based at least in part on a region growing algorithm. In other instances, the process 500 can expand the first mask until it meets or intersects a different mask. In some instances, the operation 508 can be based at least in part on classification data associated with voxels or pseudo-pixels represented by the first mask. That is, in some cases expanding a mask associated with a vehicle, for example, can be different than expanding a mask associated with a pedestrian. For example, a threshold increase can be based on a classification type.

At operation 510, the process 500 can include determining whether the expanded first mask comprises or is associated with all object voxels that are associated with sensor data. As a non-limiting example, the operation 510 can result in the affirmative in a scenario where the voxel space is associated with sensor data representing a single object and expanding the mask can include all of the voxels that include sensor data within some radius of the mask. As can be understood, the operation 510 can be represented as illustrated in FIG. 4A. If the operation 510 results in the affirmative, the process 500 can proceed to operation 516. If the operation 510 results in the negative, the process 500 can proceed to operation 512 where the process 500 can perform a check regarding whether the expanded first mask meets or exceeds a margin. As a non-limiting example, the operation 512 can result in the affirmative if the process 500 uses a fixed value or a percentage as a margin. If the operation 512 results in the affirmative, the process 500 can proceed to operation 516. If the operation 512 results in the negative, the process 500 can proceed to operation 514 where the process 500 can perform a check regarding whether the expanded first mask meets or intersects with a different mask.

As a non-limiting example, the operation 514 can result in the affirmative if the process 500 expands the first mask in a voxel space where another mask representing another object is adjacent to or in close proximity to the first mask. As can be understood, the operation 514 can be represented as illustrated in FIG. 4B. If the operation 514 results in the negative, the process 500 can return to operation 508. If the operation 514 results in the affirmative, the process 500 can proceed to operation 516. Shown in this configuration for purposes of illustration, the process 500 can perform the operations, 510, 512, and 514 in any order and also in parallel.

Additionally, the operations 510, 512, and 514 can be performed independently on each side (e.g., left, right, top, bottom) of the first mask. Thus, as can be understood, the first mask can expand on one side until it intersects with a different mask, expand on a different side until it meets or exceeds a margin, and expand on yet a different side until it comprises all voxels associated with sensor data on that side, for example, by using clustering techniques based at least in part on a region growing algorithm. Additionally, though depicted in FIG. 5 for illustrative purposes, not all operations 510, 512, 514 need be performed. As a non-limiting example, any or all of operations 510, 512, or 514 may be omitted.

At operation 516, the process 500, after expanding the first mask, can generate a second mask (e.g., an expanded mask). In some instances, the second mask can represent an area larger than the first mask. In other instances, the second mask can represent an area substantially similar to the first mask. In some instances, in the case where the expanded first mask meets or intersects with a different mask, the operation 516 can include generating the second mask with a "buffer" between different masks, to improve segmentation of the voxel data in other operations, for example.

Figure 6:
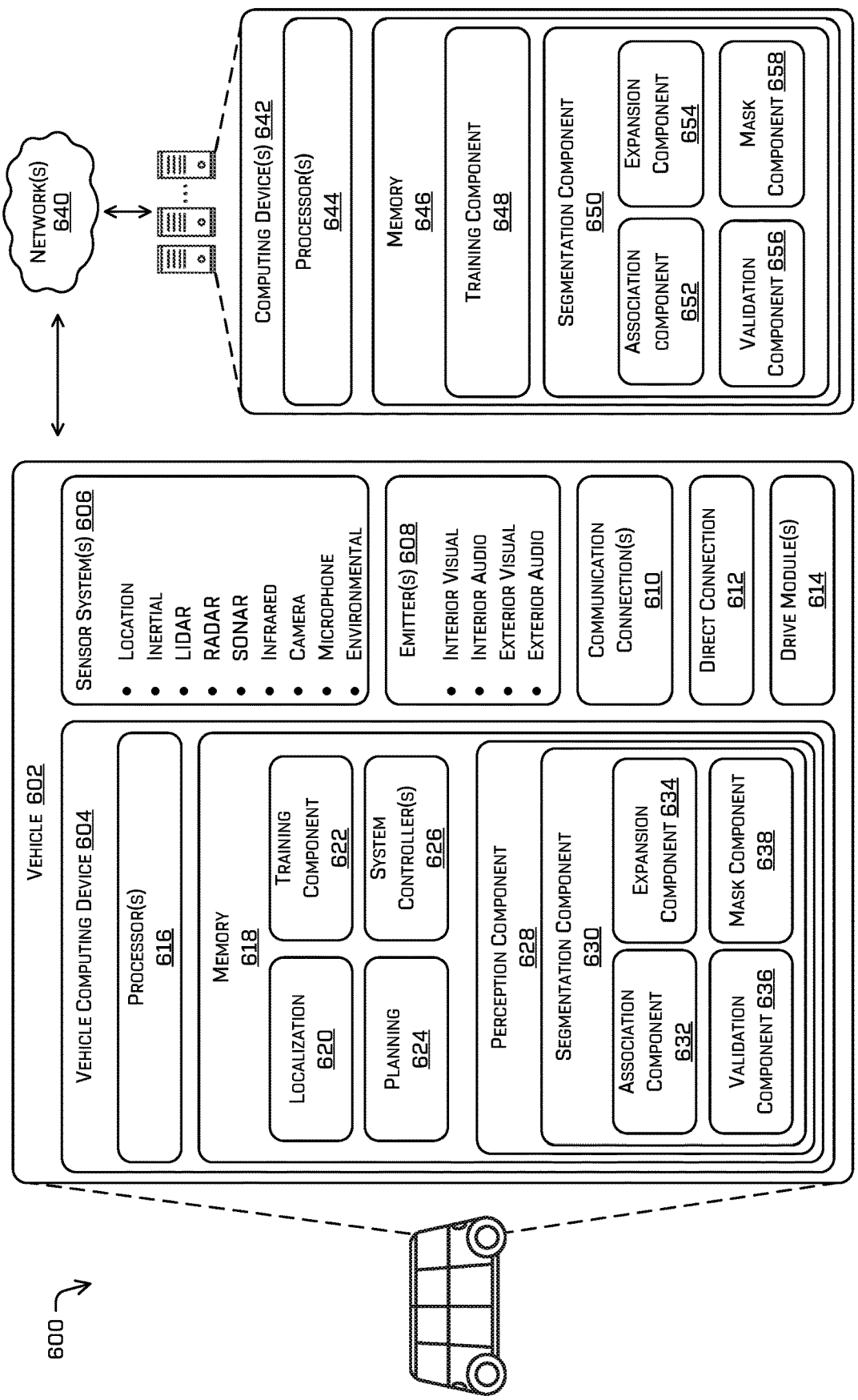
FIG. 6 depicts a block diagram of an example system for implementing the techniques described herein.

FIG. 6 depicts a block diagram of an example system 600 for implementing the techniques discussed herein. In at least one example, the system 600 can include a vehicle 602, which can be the same vehicle as the vehicle 202 described above with reference to FIG. 2.

The vehicle 602 can include a vehicle computing device 604, one or more sensor systems 606, one or more emitters 608, one or more communication connections 610, at least one direct connection 612 (e.g., for physically coupling with the vehicle 602 to exchange data and/or to provide power), and one or more drive modules 614.

The one or more sensor systems 606 can be configured to capture sensor data associated with an environment, which can be an environment similar to the environment 200 described above with reference to FIG. 2.

The vehicle computing device 604 can include one or more processors 616 and memory 618 communicatively coupled with the one or more processors 616. In the illustrated example 600, the vehicle 602 is an autonomous vehicle; however, the vehicle 602 can be any other type of vehicle. In the illustrated example, the memory 618 of the vehicle computing device 604 stores a localization component 620, a training component 622, a planning component 624, one or more system controllers 626, and a perception component 628. Though depicted as residing in the memory 618 for illustrative purposes, it is contemplated that the localization component 620, the training component 622, the planning component 624, the one or more system controllers 626, and the perception component 628 can additionally, or alternatively, be accessible to the vehicle 602 (e.g., stored remotely).

In at least one example, the localization component 620 can include functionality to receive data from the sensor system(s) 606 to determine a position of the vehicle 602. For example, the localization component 620 can include and/or request/receive a three-dimensional map of an environment and can continuously determine a location of the autonomous vehicle within the map. In some instances, the localization component 620 can use SLAM (simultaneous localization and mapping) or CLAMS (calibration, localization and mapping, simultaneously) to receive image data, LIDAR data, RADAR data, SONAR data, IMU data, GPS data, wheel encoder data, or any combination thereof, and the like to accurately determine a location of the autonomous vehicle. In some instances, the localization component 620 can provide data to various components of the vehicle 602 to determine an initial position of an autonomous vehicle for generating a candidate trajectory, as discussed herein.

In some instances, the training component 622 can include functionality to receive data from the sensor system(s) 606 and create a training dataset for use in a machine learning algorithm to identify classes in the data. For example, the training component 622 can indicate classes such as vehicles, pedestrians, bicycles, motorcycles, trees, road surfaces, buildings etc. In some instances, the training component 622 can include functionality to manually or automatically indicate an extent (e.g., length, width, height) of the objects represented in the sensor data. In some instances, the training data can include a three-dimensional bounding box associated with LIDAR data representing an extent of the objects represented in the training data. The training component 622 can then associate sensor data with these classes and/or extents to create a training dataset. In some instances, at least a portion of the training dataset can include ground truth information representing a mask that is smaller than a true extent (e.g., length and width) of an object represented by the object. Such ground truth may be created, for example, by hand labeled data, by simulated data, or by other algorithms which associate a mask with data, the extents of which are subsequently reduced by an amount. The training dataset can be used to train a machine learning algorithm to identify objects within the sensor data. Once the machine learning algorithm is trained, the machine learning algorithm can then output one or more masks representing one or more objects based on the sensor data.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 624 can alternatively, or additionally, use data from the perception component 628 to determine a path for the vehicle 602 to follow to traverse through an environment. For example, the planning component can receive data from the perception component 628 regarding objects associated with an environment. Using this data, the planning component 624 can determine a route to travel from a first location (e.g., a current location) to a second location (e.g., a target location) to avoid objects in an environment.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive module(s) 614 and/or other components of the vehicle 602, which may be configured to operate in accordance with a trajectory provided from the planning system 624.

In some examples, the perception component 628 can include functionality to perform object detection, segmentation, and/or classification. In some examples, the perception component 628 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 628 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In the illustrated example 600, the perception component 628 can include a segmentation component 630. The segmentation component can, in turn, include an association component 632, an expansion component 634, a validation component 636, and an mask component 638.

In at least one example, the association component 632 can include functionality to receive sensor data and associate the sensor data with a voxel space, the voxel space comprising, in some instances, three dimensions. In some instances, the association component 632 can include functionality to statistically accumulate sensor data and process the sensor as it is associated with individual voxels. In other instances, the association component 632 can include functionality to associate the sensor data with a voxel space as raw sensor data (e.g., with individual <x, y, z, range, time, etc.> values associated with data points).

In the illustrated example 600, the expansion component 634 can include functionality to receive a mask and expand the mask, the mask representing an object in the voxel space, in some examples, in two dimensions. In some instances, the mask representing the object in two dimensions can use a plan view or a top-down perspective. For purposes of illustration, this mask can be referred to as the first mask. Such a mask may be provided, for example, by inputting the voxel grid as an image of multiple channels into a machine learning algorithm trained to output masks, as described herein. Expansion of the mask may be performed in accordance with any of the techniques described herein (e.g., as described with respect to FIG. 5).

In the illustrated example 600, the validation component 636 can include functionality to determine whether the expansion component 634 sufficiently expands the first mask. In some instances, the validation component 636 can determine whether the expansion component 634 expands the first mask to comprise all voxels associated with sensor data within a region around the mask (e.g., based at least in part on a seed voxel and/or based at least in part on a distance or radius from a seed voxel), whether the expansion component 634 expands the first mask to meet or exceed a margin, or whether the expansion component 634 expands the first mask to meet or intersect a different mask. In some instances, the validation component 636 can perform these functions in parallel or serially. Additionally, in some instances, the validation component 636 can perform these functions, as the expansion component 634 expands the first mask, per side of the first mask. As discussed above, the margin can be a fixed value or a percentage of the first mask. Additionally, the validation component 636 can use techniques such as clustering techniques based at least in part on region growing. In some instances, based on the determination of the validation component 636, the expansion component 634 can continue to expand the first mask. In some instances, based on the determination of the validation component 636, mask component 638 can receive data from the expansion component 634.

In the illustrated example 600, the mask component 638 can include functionality to determine and/or generate a second mask based at least in part on the data from the expansion component 634. In some instances, the mask component 638 can determine and/or generate the second mask based at least in part on the first mask.

The segmentation component 630 can include functionality to segment the sensor data associated with the second mask to associate an object and/or an object identifier with the sensor data associated with the second mask. In some instances, the segmentation component 630 can apply one or more clustering techniques, such as region growing, to the sensor data or the voxels associated with the second mask to determine the object in the voxel space. Additionally, the segmentation component 630 can, in some instances, associate an object identifier with the sensor data or the voxels associated with the second mask.

In at least one example, the sensor system(s) 606 can include LIDAR sensors, RADAR sensors, ultrasonic transducers, SONAR sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally, and/or alternatively, the sensor system(s) 606 can send sensor data, via the one or more networks 640, to the one or more computing device(s) 642 at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive modules 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 614. In some cases, the sensor system(s) on the drive module(s) 614 can overlap or supplement corresponding systems of the vehicle 602 (e.g., sensor system(s) 606).

The drive module(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

In at least one example, the localization component 620 and/or the planning component 624 can process sensor data, as described above, and can send their respective outputs, over the one or more network(s) 640, to one or more computing device(s) 642. In at least one example, the localization component 620, and/or the planning component 624 can send their respective outputs to the one or more computing device(s) 642 at a particular frequency, after a lapse of a predetermined period of time, in near real-time, etc.

The vehicle 602 can send sensor data to one or more computing device(s) 642, via the network(s) 640. In some examples, the vehicle 602 can send raw sensor data to the computing device(s) 642. In other examples, the vehicle 602 can send processed sensor data and/or representations of sensor data to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can receive the sensor data (raw or processed) and can generate and/or update maps based on the sensor data. Additionally, the computing device(s) 642, in at least one example, can include one or more processors 644 and memory 646 communicatively coupled with the one or more processors 644. In the illustrated example, the memory 646 of the computing device(s) 642 stores the training component 648 and the segmentation component 650, which comprises the association component 652, the expansion component 654, the validation component 656, and the mask component 658.

The training component 648 can receive the sensor data and create a training dataset. As can be understood, the training component 648 can correspond in functionality discussed in conjunction with the training component 622.

In general, the segmentation component 650 can receive data from one or more vehicles (such as the vehicle 602) and can segment the sensor data to detect objects in an environment. As can be understood, the segmentation component 650 and components included therein can correspond in functionality discussed in connection with the segmentation component 630.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 and the memory 646 are examples of non-transitory computer-readable media. The memory 618 and the memory 646 can store an operating system and one or more software applications, instructions, programs, and/or data to implement the methods described herein and the functions attributed to the various systems. In various implementations, the memory 618 and the memory 646 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 618 and 646 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

Figure 7:
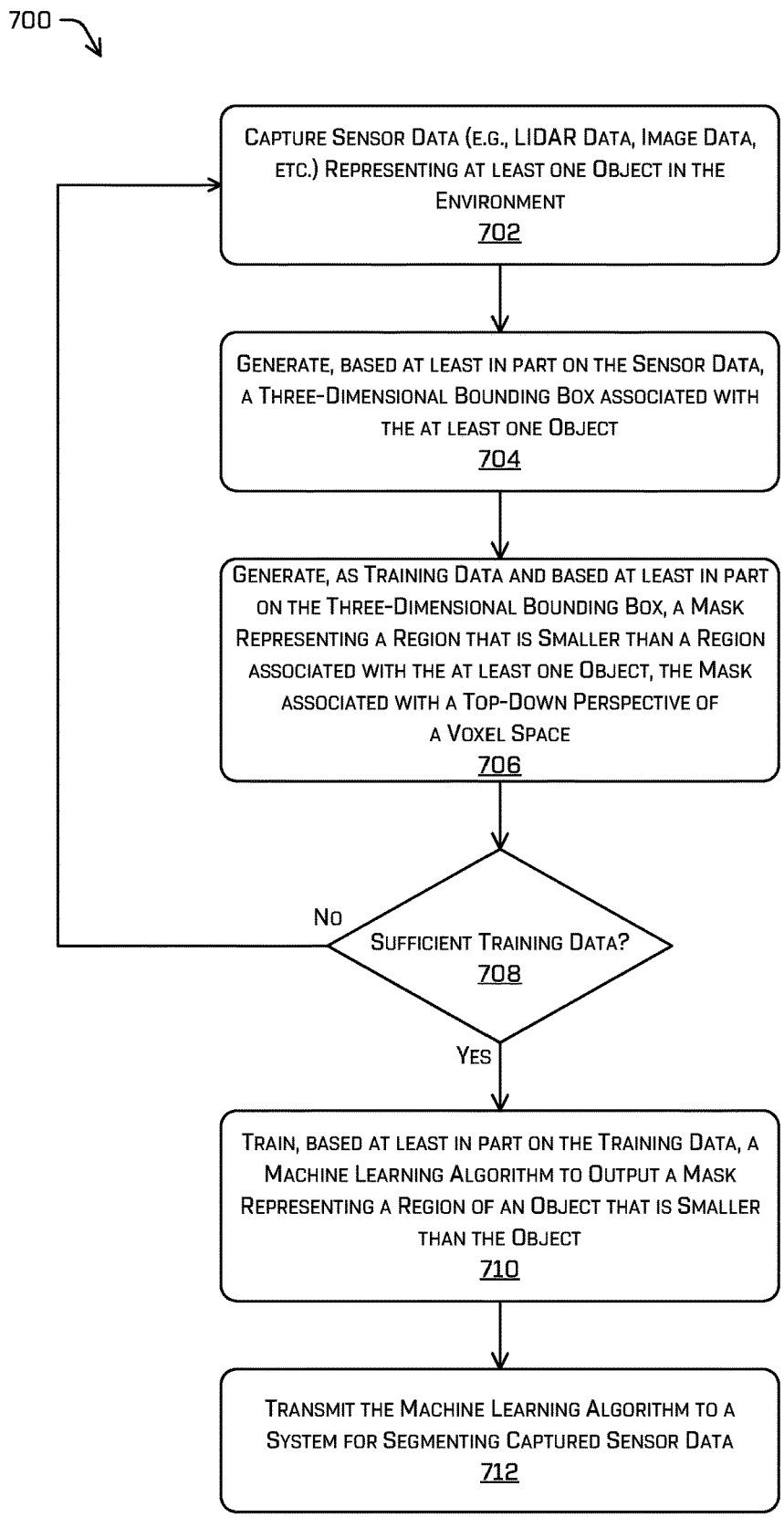
FIG. 7 depicts an example process for training a machine learning algorithm to output one or more masks.

FIG. 7 depicts an example process 700 for training a machine learning algorithm to output one or more masks associated with one or more objects. In some examples, some or all of the process 500 can be performed by one or more components in FIG. 6, as described herein.

At operation 702, the process can include capturing sensor data (e.g., LIDAR data, image data, etc.) representing at least one object in an environment. For example, the environment may include objects including, but not limited to, vehicles, pedestrians, buildings, animals, and the like.

At operation 704, the process can include generating, based at least in part on the sensor data, a three-dimensional bounding box associated with the at least one object. For example, the bounding box can represent an extent (e.g., length, width, height) of the object represented in the image data. In some instances, the operation 704 can include associating at least a portion for the sensor data with a voxel space. In some instances, a voxel of the voxel space can include any number of features representing the LIDAR data. For example, features of a voxel may include, but are not limited to, as mean or average three-dimensional coordinate values of the LIDAR data associated with the voxel, one or more covariance matrices associate one or more degrees of freedom of data (e.g., x-direction, y-direction, z-direction, etc.) semantic segmentation probabilities (e.g., a probability that one or more LIDAR data points represents one or more objects, including but not limited to, vehicles, animals, pedestrians, buildings, and the like), an indication of occupancy of the voxel, ray casting information, a free space indication, background subtraction information, and the like.

At operation 706, the process can include generating, as training data and based at least in part on the three-dimensional bounding box, a mask representing a region that is smaller than a region associated with the at least on object, the mask associated with a top-down perspective of the voxel space. For example, the mask may represent a representation which is smaller than the ground truth bounding box of the object represented in the voxel space.

At operation 708, the process can include determining whether there is sufficient training data. If no, the process can return to the operation 702 to capture additional sensor data and to generate additional bounding boxes and/or masks. If yes, the process can continue to operation 710.

At operation 710, the process can include training, based at least in part on the training data, a machine learning algorithm to output a mask representing a region of an object that that is smaller than the object. For example, the mask may represent the "interior" of the object, such that the mask represents relatively high level of confidence that voxels associated with the mask are, in fact, associated with the particular object.

At operation 712, the process can include transmitting the machine learning algorithm to a system for segmenting captured sensor data. As discussed herein, the system can include an autonomous vehicle or any system utilizing machine vision, as discussed herein.

Figure 8:
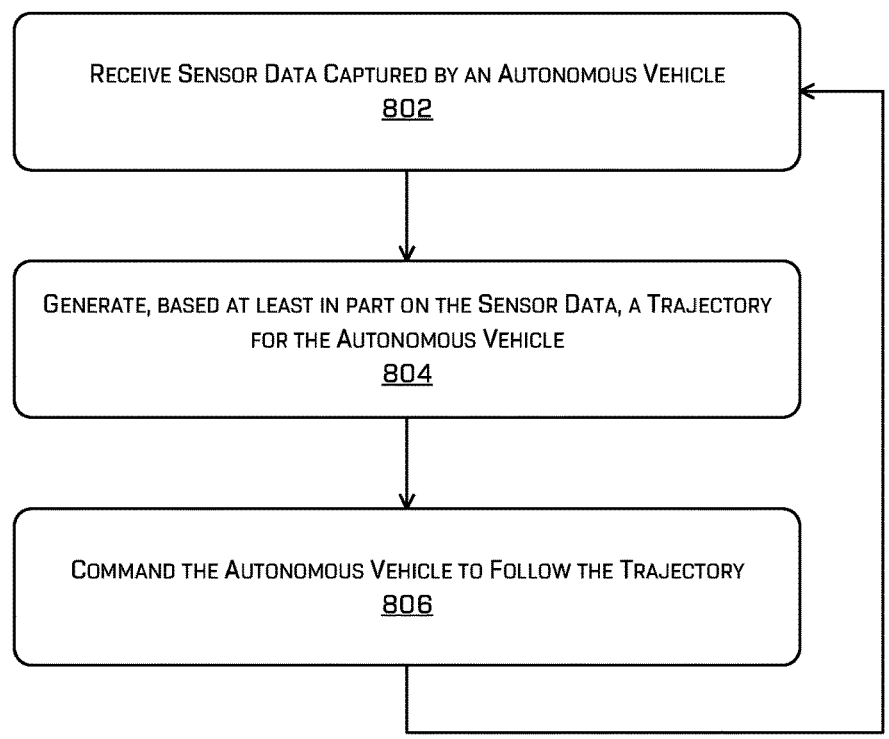
FIG. 8 depicts an example process for commanding an autonomous vehicle based at least in part on sensor data.

FIG. 8 depicts an example process 800 for commanding an autonomous vehicle based at least in part on a location based on sensor data, as discussed herein. For example, some or all of the process 800 can be performed by one or more components in FIG. 6, as described herein. For example, some or all of the process 800 can be performed by the one or more components of the vehicle 602.

At operation 802, the process can include receiving sensor data captured by an autonomous vehicle. In some instances, the sensor data can be received by the vehicle 602 for determining a region associated with a ground surface of the environment.

At operation 804, the process can include generating, based at least in part on the sensor data, a trajectory for the autonomous vehicle. For example, and as discussed herein, the operation 804 can include receiving segmentation data associated with an object and tracking the object (e.g., a car, pedestrian, etc.) to determine the trajectory based at least in part on the segmentation data.

At operation 806, the process can include commanding the autonomous vehicle to follow the trajectory. In some instances, the operation 806 can include generating a route, trajectory, and/or control signals to one or more systems of the autonomous vehicle to navigate the autonomous vehicle within the environment.

FIGS. 1, 5, 7, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A system comprising: one or more processors; and one or more computer-readable media storing instructions executable by the one or more processors, wherein the instructions, when executed, cause the system to perform operations comprising: capturing sensor data using a light detection and ranging (LIDAR) sensor on a vehicle; associating the sensor data with a voxel space, the voxel space comprising at least three dimensions; generating a two-dimensional representation of the voxel space, the two-dimensional representation comprising a number of image channels; inputting the two-dimensional representation into a machine learning algorithm; receiving, from the machine learning algorithm, a first mask representing an object in the voxel space in two dimensions; generating, based at least in part on an expansion of the first mask, a second mask, the expansion based at least in part on a region growing algorithm, a size of the first mask, or an intersection with a third mask associated with another object; and segmenting, based at least in part on the second mask, the sensor data.

B: The system of paragraph A, wherein the machine learning algorithm is trained to receive captured LIDAR data representing a detected object having a first width and a first length and to output a mask associated with the detected object, the mask having a second width less than or equal to the first width and a second length less than or equal to the first length.

C: The system of paragraph A or B, wherein a pseudo-pixel is associated with a voxel of the voxel space, the pseudo-pixel representing a column of voxels of the voxel space.

D: The system of paragraph C, wherein the pseudo-pixel comprises features associated with the column of voxels.

E: The system of any of paragraphs A-D, wherein segmenting the sensor data comprises using the region growing algorithm to cluster one or more voxels of the voxel space within the second mask.

F: A method comprising: capturing sensor data of an environment using one or more sensors, the sensor data indicative of an object in the environment; associating the sensor data with a voxel space; receiving a first mask associated with a portion of the voxel space, the first mask representing a region smaller in size than the object; generating a second mask by expanding the first mask; and segmenting, based at least in part on the second mask, the sensor data.

G: The method of paragraph F, further comprising: generating, based at least in part on segmenting the sensor data, a trajectory for an autonomous vehicle; and controlling, based at least in part on the trajectory, the autonomous vehicle to traverse the environment.

H: The method of paragraph F or G, further comprising: inputting a two-dimensional representation of the voxel space into a machine learning algorithm; and receiving, as the first mask, an output of the machine learning algorithm.

I: The method of paragraph H, wherein the two-dimensional representation of the voxel space comprises an image having a number of channels based at least in part on a height of the voxel space and one or more features.

J: The method of paragraph I, wherein the one or more features comprise: an average of sensor data, a number of times sensor data is associated with a voxel, a covariance of sensor data, a probability of a voxel belonging to one or more classifications, a ray casting information associated with a voxel; or an occupancy of a voxel.

K: The method of any of paragraphs F-J, wherein the one or more sensors comprises one or more light detection and ranging (LIDAR) sensors.

L: The method of any of paragraphs F-K, wherein the first mask is generated, based at least in part, on classification data associated with the sensor data.

M: The method of paragraph L, wherein the classification data is at least one or more of a vehicle, a bicycle, or a pedestrian.

N: The method of any of paragraphs F-M, further comprising: generating the second mask based at least in part on an intersection of an expansion of the first mask and a third mask associated with another object associated with the voxel space.

O: The method of any of paragraphs F-N, wherein segmenting the sensor data comprises associating one or more voxels of the voxel space associated with the second mask.

P: A non-transitory computer-readable medium storing instructions executable by one or more processors, wherein the instructions, when executed, cause the one or more processors to perform operations comprising: receiving sensor data of an environment from one or more sensors on an autonomous vehicle, the sensor data associated with an object in the environment; associating the sensor data with a voxel space; receiving a first mask associated with a portion of the voxel space, the first mask representing at least a portion of the object using a second perspective; generating a second mask by expanding the first mask; and segmenting, based at least in part on the second mask, the sensor data.

Q: The non-transitory computer-readable medium of paragraph P, wherein segmenting the sensor data comprises associating one or more voxels of the voxel space with the second mask.

R: The non-transitory computer-readable medium of paragraph P or Q, the operations further comprising: generating the second mask based at least in part on an intersection of an expansion of the first mask and a third mask associated with another detected object in the voxel space.

S: The non-transitory computer-readable medium of any of paragraphs P-R, the operations further comprising: inputting, as a two-dimensional representation, the voxel space into a machine learning algorithm; and receiving, as the first mask, an output of the machine learning algorithm, wherein the two-dimensional representation comprises a pseudo-image having a length associated with a first dimension of the voxel space, a width associated with a second dimension of the voxel space, and a number of channels, and further wherein the number of channels is based, at least in part, on a third dimension of the voxel space and one or more features comprising an average of sensor data, a covariance of sensor data, a number of observations of sensor data, an occupancy, or one or more probabilities associated with a semantic classification.

T: The non-transitory computer-readable medium of any of paragraphs P-S, the operations further comprising: generating, based at least in part on segmenting the sensor data, a trajectory for the autonomous vehicle; and controlling, based at least in part on the trajectory, the autonomous vehicle to traverse the environment.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      capturing sensor data using a light detection and ranging (LIDAR) sensor on a vehicle;
      associating the sensor data with a voxel space, the voxel space comprising at least three dimensions;
      generating a two-dimensional representation of the voxel space, the two-dimensional representation comprising a number of image channels;
      inputting the two-dimensional representation into a machine learning algorithm;
      receiving, from the machine learning algorithm, a first mask representing an object in the voxel space in two dimensions;
      generating, based at least in part on an expansion of the first mask, a second mask, the expansion based at least in part on a region growing algorithm, a size of the first mask, or an intersection with a third mask associated with another object; and
      segmenting, based at least in part on the second mask, the sensor data.

2. The system of claim 1, wherein the machine learning algorithm is trained to receive captured LIDAR data representing a detected object having a first width and a first length and to output a mask associated with the detected object, the mask having a second width less than or equal to the first width and a second length less than or equal to the first length.

3. The system of claim 1, wherein a pseudo-pixel is associated with a voxel of the voxel space, the pseudo-pixel representing a column of voxels of the voxel space.

4. The system of claim 3, wherein the pseudo-pixel comprises features associated with the column of voxels.

5. The system of claim 1, wherein segmenting the sensor data comprises using the region growing algorithm to cluster one or more voxels of the voxel space within the second mask.

6. A method comprising:
   capturing sensor data of an environment using one or more sensors, the sensor data indicative of an object in the environment;
   associating the sensor data with a voxel space;
   receiving a first mask associated with a portion of the voxel space, the first mask representing a region smaller in size than the object;
   generating a second mask by expanding the first mask; and
   segmenting, based at least in part on the second mask, the sensor data.

7. The method of claim 6, further comprising:
   generating, based at least in part on segmenting the sensor data, a trajectory for an autonomous vehicle; and
   controlling, based at least in part on the trajectory, the autonomous vehicle to traverse the environment.

8. The method of claim 6, further comprising:
   inputting a two-dimensional representation of the voxel space into a machine learning algorithm; and
   receiving, as the first mask, an output of the machine learning algorithm.

9. The method of claim 8, wherein the two-dimensional representation of the voxel space comprises an image having a number of channels based at least in part on a height of the voxel space and one or more features.

10. The method of claim 9, wherein the one or more features comprise:
an average of sensor data,
a number of times sensor data is associated with a voxel,
a covariance of sensor data,
a probability of a voxel belonging to one or more classifications,
a ray casting information associated with a voxel; or
an occupancy of a voxel.

11. The method of claim 6, wherein the one or more sensors comprises one or more light detection and ranging (LIDAR) sensors.

12. The method of claim 6, wherein the first mask is generated, based at least in part, on classification data associated with the sensor data.

13. The method of claim 12, wherein the classification data is at least one or more of a vehicle, a bicycle, or a pedestrian.

14. The method of claim 6, further comprising:
generating the second mask based at least in part on an intersection of an expansion of the first mask and a third mask associated with another object associated with the voxel space.

15. The method of claim 6, wherein segmenting the sensor data comprises associating one or more voxels of the voxel space with the second mask.

16. A non-transitory computer-readable medium storing instructions executable by one or more processors, wherein the instructions, when executed, cause the one or more processors to perform operations comprising:
receiving sensor data of an environment from one or more sensors on an autonomous vehicle, the sensor data associated with an object in the environment;
associating the sensor data with a voxel space;
receiving a first mask associated with a portion of the voxel space, the first mask representing at least a portion of the object using a second perspective;
generating a second mask by expanding the first mask; and
segmenting, based at least in part on the second mask, the sensor data.

17. The non-transitory computer-readable medium of claim 16, wherein segmenting the sensor data comprises associating one or more voxels of the voxel space with the second mask.

18. The non-transitory computer-readable medium of claim 16, the operations further comprising:
generating the second mask based at least in part on an intersection of an expansion of the first mask and a third mask associated with another detected object in the voxel space.

19. The non-transitory computer-readable medium of claim 16, the operations further comprising:
inputting, as a two-dimensional representation, the voxel space into a machine learning algorithm; and
receiving, as the first mask, an output of the machine learning algorithm,
wherein the two-dimensional representation comprises a pseudo-image having a length associated with a first dimension of the voxel space, a width associated with a second dimension of the voxel space, and a number of channels, and
further wherein the number of channels is based, at least in part, on a third dimension of the voxel space and one or more features comprising an average of sensor data, a covariance of sensor data, a number of observations of sensor data, an occupancy, or one or more probabilities associated with a semantic classification.

20. The non-transitory computer-readable medium of claim 16, the operations further comprising:
generating, based at least in part on segmenting the sensor data, a trajectory for the autonomous vehicle; and
controlling, based at least in part on the trajectory, the autonomous vehicle to traverse the environment.

* * * * *